United States Patent
Maguire et al.

(10) Patent No.: US 9,590,216 B2
(45) Date of Patent: Mar. 7, 2017

(54) ELECTRIC VEHICLE BATTERY ASSEMBLY ENCLOSURE

(71) Applicant: FORD GLOBAL TECHNOLOGIES, LLC, Dearborn, MI (US)

(72) Inventors: Patrick Daniel Maguire, Ann Arbor, MI (US); Yi Zhang, Ann Arbor, MI (US); Rodolfo Palma, Canton, MI (US); Hyung Min Baek, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 14/266,062

(22) Filed: Apr. 30, 2014

(65) Prior Publication Data

US 2015/0318525 A1 Nov. 5, 2015

(51) Int. Cl.
*H01M 2/10* (2006.01)

(52) U.S. Cl.
CPC ....... *H01M 2/1083* (2013.01); *H01M 2/1077* (2013.01); *H01M 2220/20* (2013.01); *Y10T 29/49112* (2015.01)

(58) Field of Classification Search
CPC .............................. H01M 2/10; H01M 2/1083
See application file for complete search history.

(56) References Cited

U.S. PATENT DOCUMENTS

| 3,544,383 | A | 12/1970 | Oltman |
| 5,806,618 | A | 9/1998 | Luode |
| 6,811,197 | B1 | 11/2004 | Grabowski et al. |
| 7,128,999 | B1 | 10/2006 | Martin et al. |
| 2006/0166087 | A1 | 7/2006 | Ogata et al. |
| 2006/0201558 | A1* | 9/2006 | Marty ..................... E03C 1/055 |
| | | | 137/613 |
| 2011/0143179 | A1 | 6/2011 | Nakamori |
| 2012/0103714 | A1 | 5/2012 | Choi et al. |
| 2012/0118655 | A1* | 5/2012 | Ogihara ............. B60L 11/1877 |
| | | | 180/65.31 |
| 2012/0156539 | A1 | 6/2012 | Honjo et al. |
| 2015/0072209 | A1* | 3/2015 | Tyler ...................... B60R 16/03 |
| | | | 429/121 |

FOREIGN PATENT DOCUMENTS

DE 102010043899 5/2012

* cited by examiner

*Primary Examiner* — Karie O'Neill Apicella
(74) *Attorney, Agent, or Firm* — Carlson, Gaskey & Olds, P.C.

(57) ABSTRACT

An example battery assembly enclosure includes a tray and a lid secured to the tray to provide an interior therebetween. A plurality of molded retention features secure a battery assembly received in the interior.

20 Claims, 15 Drawing Sheets

ELECTRIC VEHICLE BATTERY ASSEMBLY ENCLOSURE

BACKGROUND

This disclosure relates generally to an enclosure for a battery assembly of an electric vehicle.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), fuel cell vehicles, and battery electric vehicles (BEVs). A powertrain of an electric vehicle is typically equipped with a battery that stores electrical energy for powering the electric machine. Housing battery assemblies within electric vehicles can be difficult.

SUMMARY

A battery assembly enclosure according to an exemplary embodiment of the present disclosure includes, among other things, a tray, and a lid secured to the tray to provide an interior therebetween. A plurality of retention features secure a battery assembly received within the interior.

In an example of the foregoing enclosure, the retention features are molded together with the lid or the tray.

In another example of any of the foregoing enclosures, the retention features include a flange defining an aperture. The flange deflects to receive a tab within the aperture when the battery assembly is installed within the interior.

In another example of any of the foregoing enclosures, the tray, the lid, or both are thermoplastic.

In another example of any of the foregoing enclosures, the lid is welded to the tray.

In another example of any of the foregoing enclosures, a connecting wall extends from the tray, the lid, or both into the interior. The connecting wall separates a serviceable area of the interior from a non-serviceable area.

In another example of any of the foregoing enclosures, the tray includes corrugations that deflect when the battery assembly is positioned within the interior.

In another example of any of the foregoing enclosures, the interior is undersized relative to the battery assembly when the battery assembly is outside the interior, such that the tray and the lid compress the battery assembly when the battery assembly is inside the interior.

In another example of any of the foregoing enclosures, an assembly includes the enclosure, and the assembly includes a battery assembly within the interior of the enclosure. The battery assembly is secured relative to the tray and lid exclusively using molded fasteners.

An enclosure according to another exemplary aspect of the present disclosure includes, among other things, a tray and a lid secured to the tray to provide an interior therebetween that houses an assembly. The interior is designed to be undersized relative to the assembly such that the tray and the lid compress the assembly housed in the interior. A plurality of retention features are molded together with the lid or the tray. The plurality of retention features secure the assembly received in the interior.

In an example of the foregoing enclosure, the assembly is a battery assembly of an electric vehicle In another example of any of the foregoing enclosures, the retention features include a flange defining an aperture. The flange deflects to receive a tab within the aperture when the assembly is installed within the interior.

In another example of any of the foregoing enclosures, the tray, the lid, or both are thermoplastic.

In another example of any of the foregoing enclosures, the lid is welded to the tray.

In another example of any of the foregoing enclosures, a connecting wall extends from the tray, the lid, or both into the interior. The connecting wall separates a serviceable area of the interior from a non-serviceable area.

In another example of any of the foregoing enclosures, the tray includes corrugations that deflect when the assembly is positioned within the interior.

A method according to yet another exemplary aspect of the present disclosure includes, among other things, securing an assembly within an electric vehicle enclosure by compressing the assembly between a lid and a tray. The lid, the tray, or both deflect during the securing.

In another example of the foregoing method, the assembly is a battery assembly. The lid, the tray, or both are thermoplastic.

In another example of any of the foregoing methods, the method includes securing the assembly to the lid and the tray using molded fasteners.

In another example of any of the foregoing methods, the method includes supporting the electric vehicle enclosure with a strap secured to the electric vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
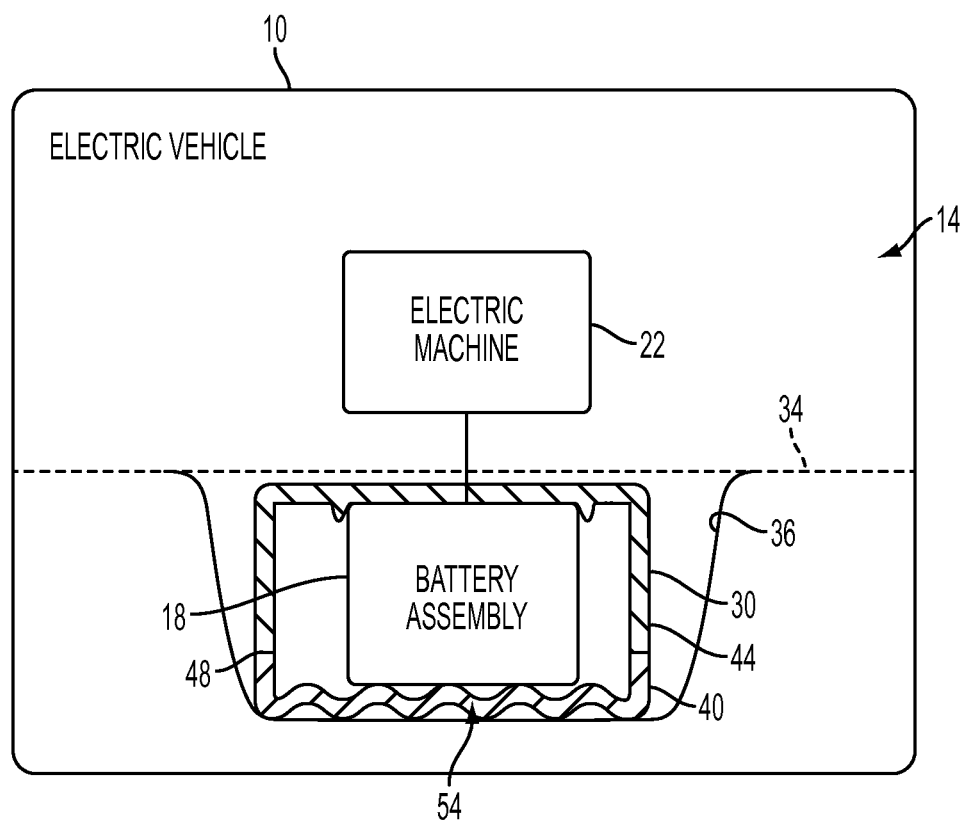
FIG. 1 illustrates a highly schematic view of an electric vehicle having an example enclosure housing a battery assembly.
Figure 2:
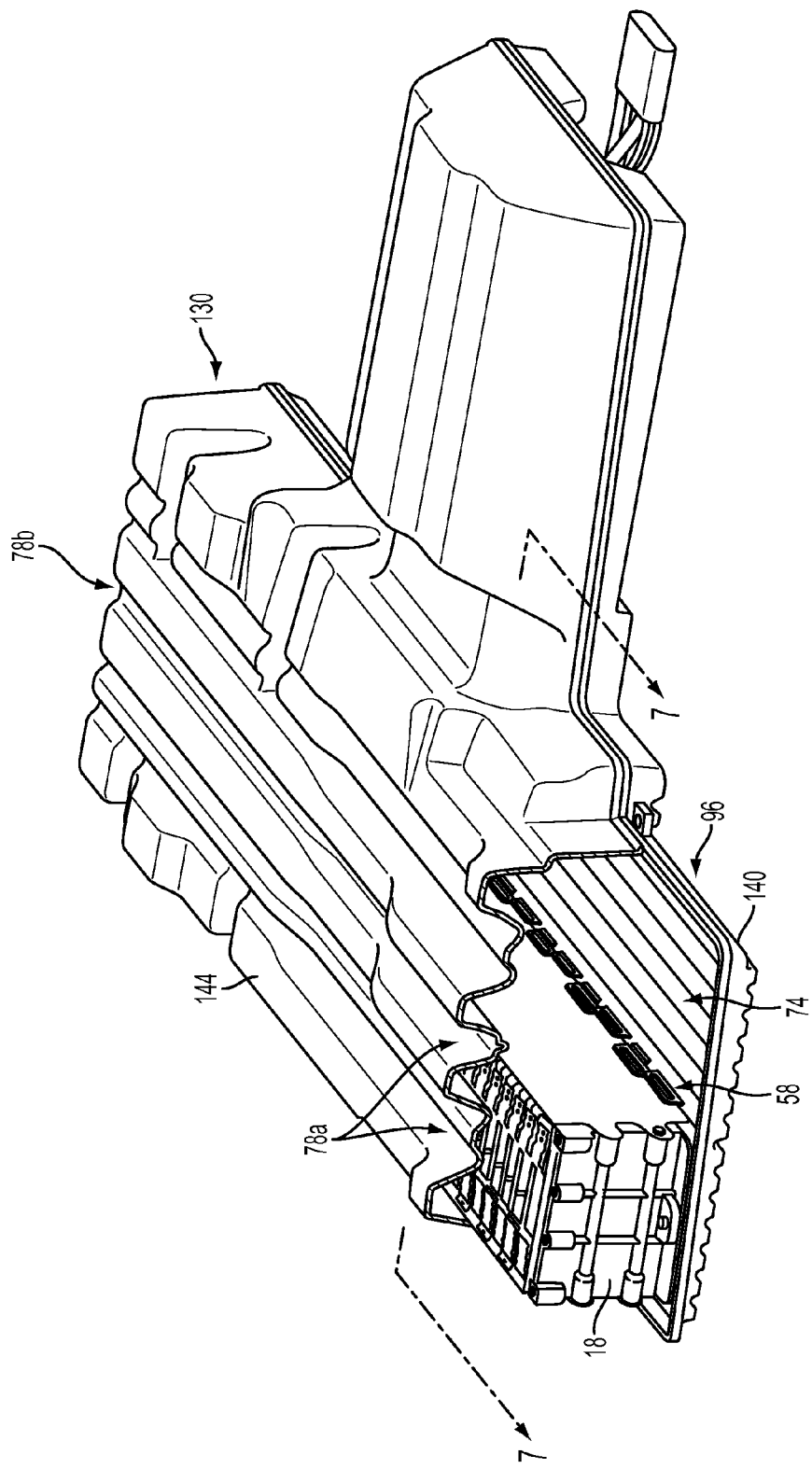
FIG. 2 illustrates a partial sectioned perspective view of another example enclosure housing a battery assembly of an electric vehicle.
Figure 3:
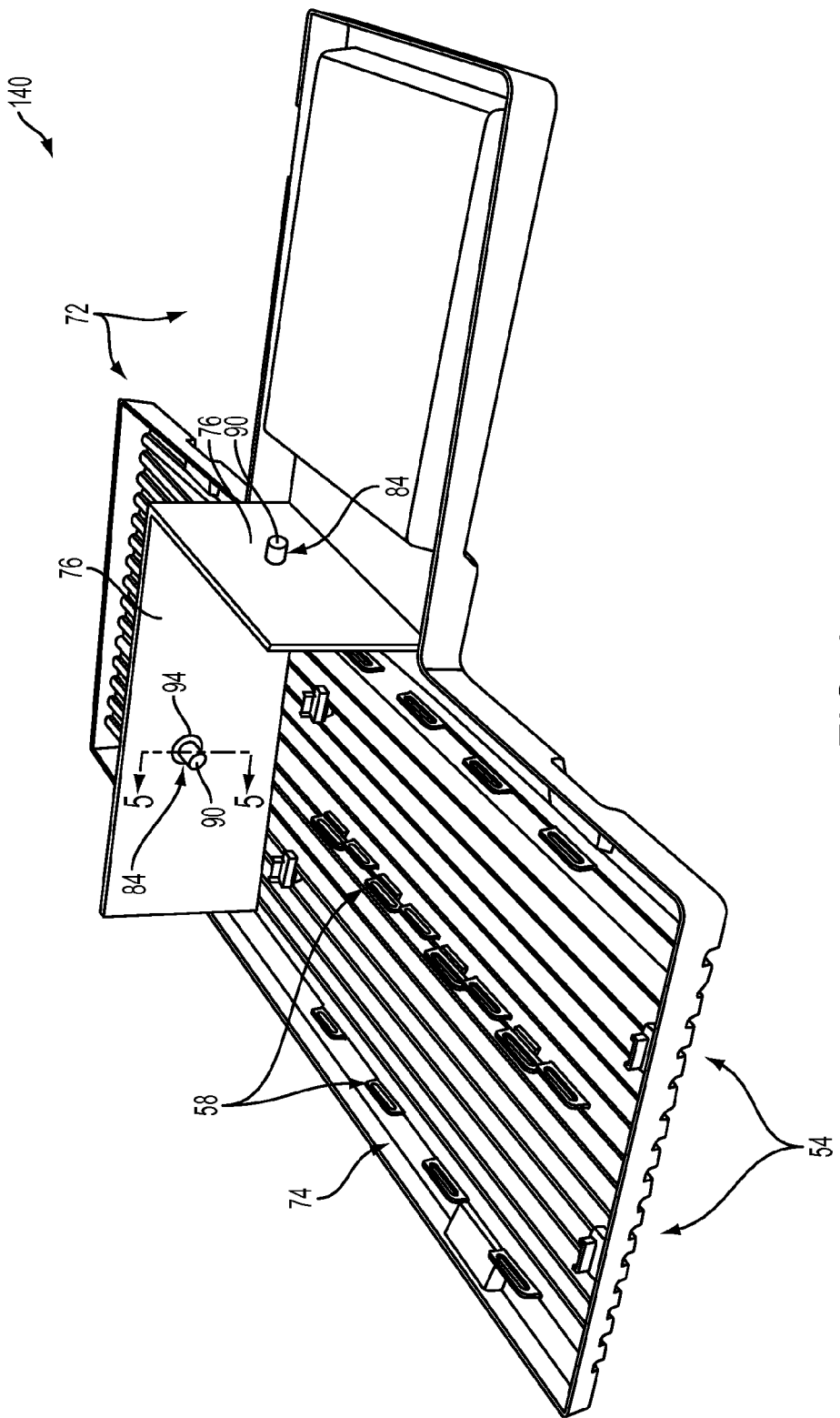
FIG. 3 illustrates a tray of the enclosure of FIG. 2.
Figure 4:
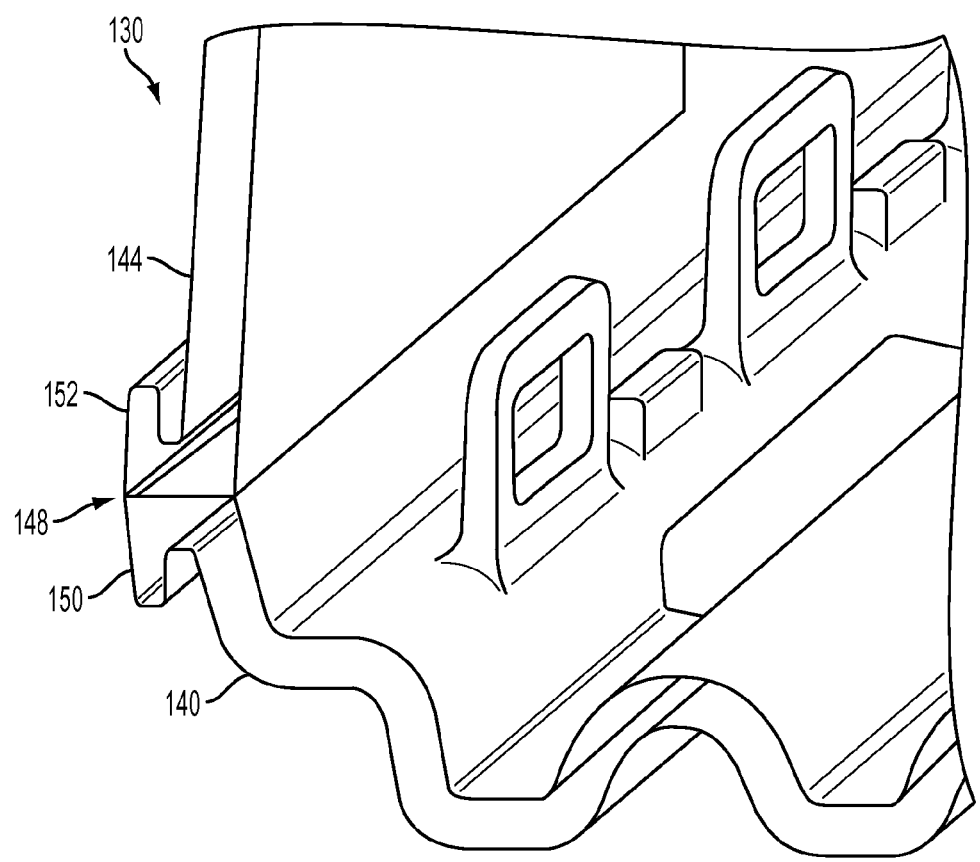
FIG. 4 illustrates a close-up perspective view of an interface between a lid and a tray of the enclosure.

Referring to FIG. 1, an example electric vehicle 10 includes a powertrain 14 having at least a battery assembly 18 and an electric machine 22. The example electric vehicle 10 is a hybrid electric vehicle (HEV), however, it should be understood that the concepts described herein are not limited to HEVs and could extend to other electrified vehicles, including, but not limited to, plug-in hybrid electric vehicles (PHEVs) and battery electric vehicles (BEVs).

The example electric machine 22 includes a motor and a separate generator. Other examples can include a combined motor/generator.

In an example embodiment, the powertrain is a power split powertrain system that employs a first drive system and a second drive system. The first drive system includes a combination of an engine (not shown) and the electric machine 22. The second drive system includes at least the electric machine 22 and the battery assembly 18. In this example, the second drive system is considered the electric drive system of the powertrain 14. The first and second drive systems generate torque to drive one or more sets of vehicle drive wheels.

The battery assembly 18 is an example type of electric vehicle battery assembly. The battery assembly 18 can have the form of a high-voltage battery that is capable of outputting electrical power to operate the electric machine 22. Other types of energy storage devices, output devices, or both can be used with the electric vehicle 10. During some modes of operation, the electric machine 22 charges the battery assembly 18. Generally, the battery assembly 18 includes side walls, end plates, a cold plate, spacers, battery cells, and related components.

In this example, the battery assembly 18 is housed in an interior of a battery assembly enclosure 30. The battery assembly 18 and the enclosure 30 are outside the electric vehicle 10. In this example, the enclosure 30 is mounted to an exterior surface of a floor pan 34 of the electric vehicle 10. The enclosure 30 holds and protects the battery assembly 18 and other related components.

Straps 36 attached to the floor pan 34 support the enclosure 30 the battery assembly 18. The straps 36 extend beneath the enclosure 30.

The example battery enclosure 30 includes a tray 40 and a lid 44. Both are molded from a thermoplastic material in this example. Some examples of thermoplastic materials that could be used include high-density polyethylene or polypropylene. Plastics that are relatively soft and ductile could be used.

In another example, one of the tray 40 or the cover 44 is a rigid material, and the other of the tray 40 or the cover 44 is compliant.

Alternatively, a non-polymer compliant material such as spring steel could be used for the enclosure (allowing spring loaded compression of the battery assembly 18 against the vehicle body).

In this example, the lid 44 has a contour to engage a contour of the floor pan 34, which permits the lid 44 and enclosure 30 to tightly hug the floor pan 34. The contours can also help to align the enclosure 30 to the floor pan 34 during assembly.

The tray 40 and the lid 44 are secured to each other at an interface 48 via vibration welding, ultrasonic welding, laser welding, hot-plate welding or some other method of joining primarily polymer structures. These joining techniques seal the tray 40 to the lid 44 to keep contaminants from entering enclosure 30.

Notably, the example tray 40 is secured to the lid 44 at the interface 48 without mechanical fasteners such as bolts, screws, etc. The method of securing also does not require a fastener flange extending laterally from the tray 40 or lid 44 to provide an area for engaging the mechanical fasteners. Eliminating a fastener flange conserves packaging space.

The tray 40 includes a plurality of corrugations 54. The enclosure 30 is undersized relative to the battery assembly 18 such that the corrugations 54 flex or deflect when the battery assembly 18 is installed within the interior of the enclosure 30. The corrugations 54 flexing can help to absorb shocks when the electric vehicle 10 is driven. The corrugations 54 flex to absorb these shocks. The corrugations 54 also provide good thermal contact to a bottom of the battery assembly 18. The corrugations 54 can similarly flex and absorb loads imparted from stones thrown by the vehicle wheels, or loads from road surfaces (speed bumps) or road debris (any foreign body).

In another example, the enclosure 30 compresses the battery assembly 18 when secured to a vehicle. In such an example, portions of the enclosure 30 compress against the battery assembly 18 due to the securing to the vehicle structure.

In this example, a height of the interior of the enclosure 30 without the battery assembly 18 is less than a height of the interior with the battery assembly 18 housed in the enclosure 30. Thus, when the battery assembly 18 is housed within the enclosure 30, the battery assembly 18 pushes against the tray 40 and the lid 44 causing portions of the enclosure 30 to flex. These portion may be the corrugations 54 or may additionally or alternatively be the top of the lid 44 or the side walls developed by the cover and tray). This results in the enclosure exerting a compressive force on the battery assembly 18 and helps secure the battery assembly 18 within the enclosure 30.

The example enclosure 30 is described in connection with an electric vehicle 10. In other examples, the enclosure could be used to house relatively heavy batteries in other applications, such as aircraft. Other items could be housed in the enclosure instead of, or in addition to, the batteries. Other possible items include power supplies, electrical control modules, etc.

Referring now to FIGS. 2 through 8 with continued reference to FIG. 1, another example enclosure 130 includes a plurality of serviceable portions 72 and a non-serviceable portion 74. The portions are separated from each other by a wall 76. Some or all of the wall 76 may be molded with a tray 140 or a lid 144. The wall 76, the tray 140, and the lid 144 are a thermoplastic material in this example.

The tray 140 and the lid 144 are secured to each other at an interface 148. The tray 140 and the lid 144 may include complementary vertically extending flanges 150 and 152 near the interface 148. During securing of the tray 140 to the lid 144, the flanges 150 and 152 can help with positioning, for example.

A thermoset, or any other engineering resin or combination of two or more polymeric materials or another resilient, flexible materials such as a spring steel could also be utilized to form some or all of the wall 76, the tray 140, the lid 144, or some combination of these.

A battery electric control module (BECM) and a bussed electrical center (BEC) may be housed within the serviceable portion 72. The battery assemblies 18 are housed in the non-serviceable portion 74. Bulkhead connections 84 can be molded into the wall 76 or other areas to electrically and thermally connect the serviceable portions 72 and non-serviceable portions 74 to each other and to areas outside the enclosure 130.

Figure 5:
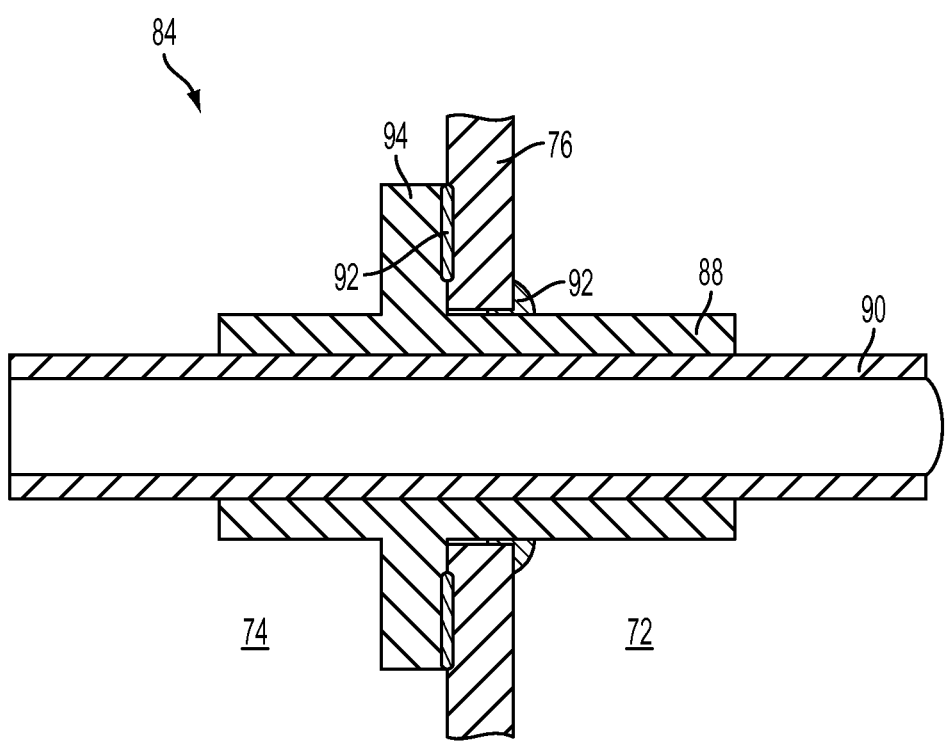
FIG. 5 shows a section view at line 5-5 in FIG. 3.
Figure 6:
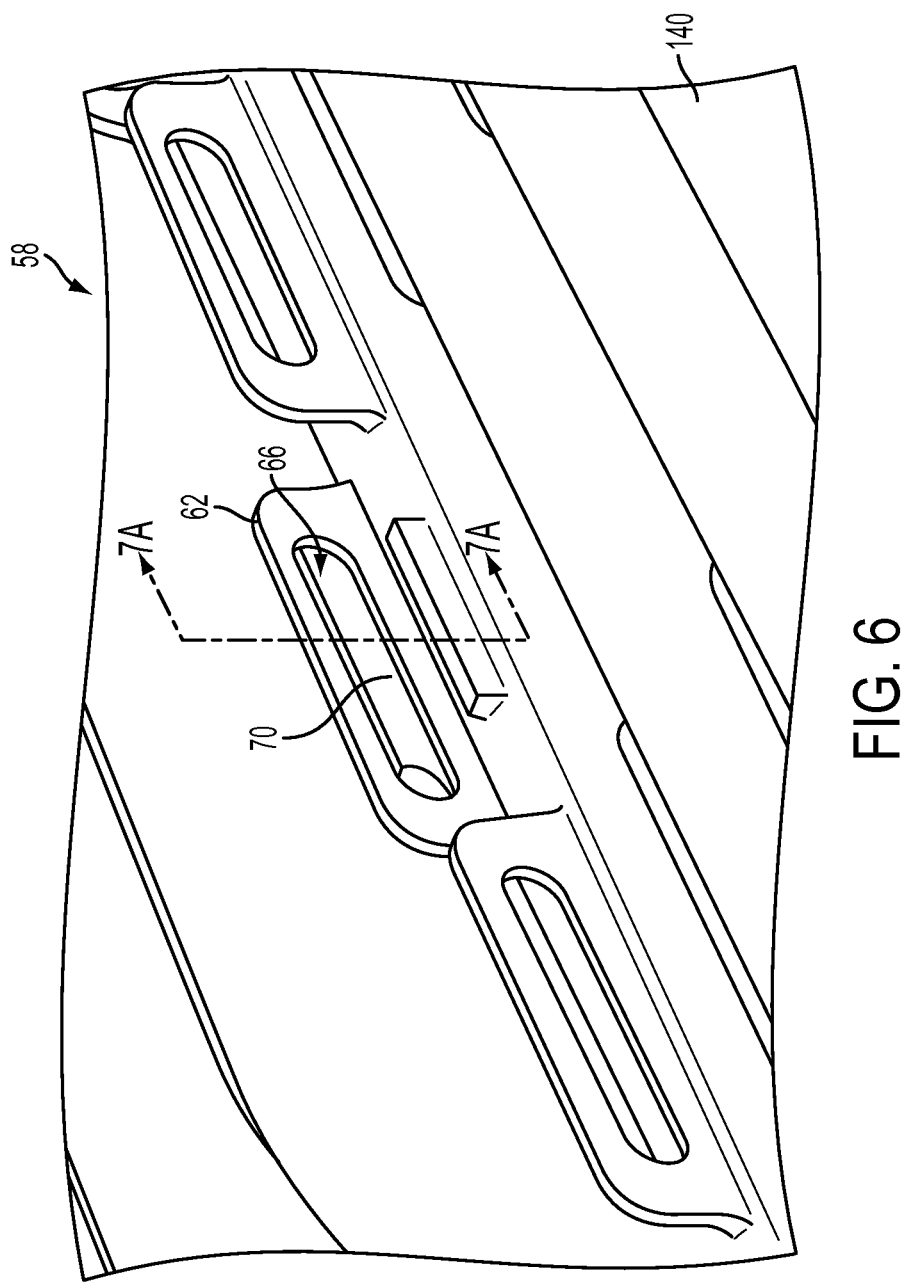
FIG. 6 illustrates a close-up perspective view of a retention feature of the enclosure in an engaged position with a battery assembly.
Figure 7B:
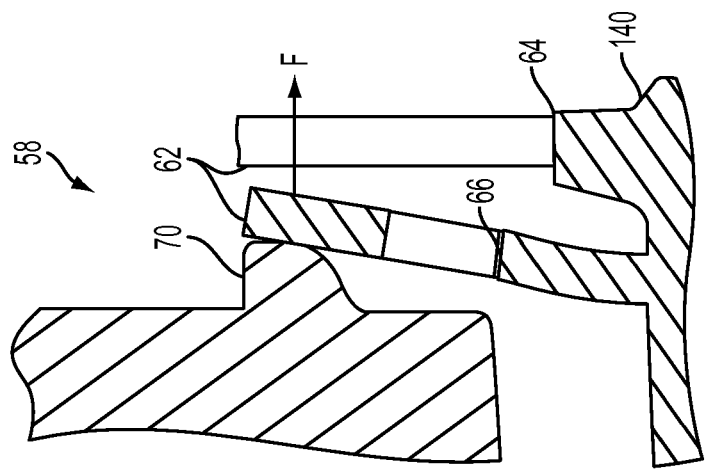
FIG. 7B illustrates a close-up section view of the retention feature at line 7-7 in FIG. 2 when the retention feature is in a flexed position.
Figure 7A:
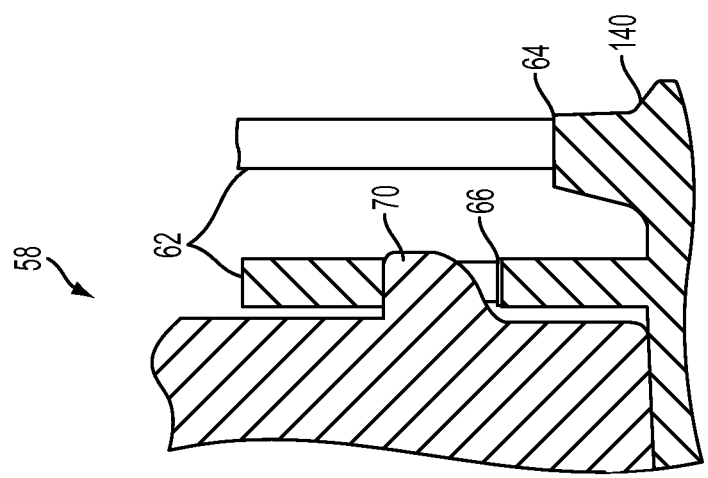
FIG. 7A illustrates a close-up section view of the retention feature at line 7-7 in FIG. 2.
Figure 8:
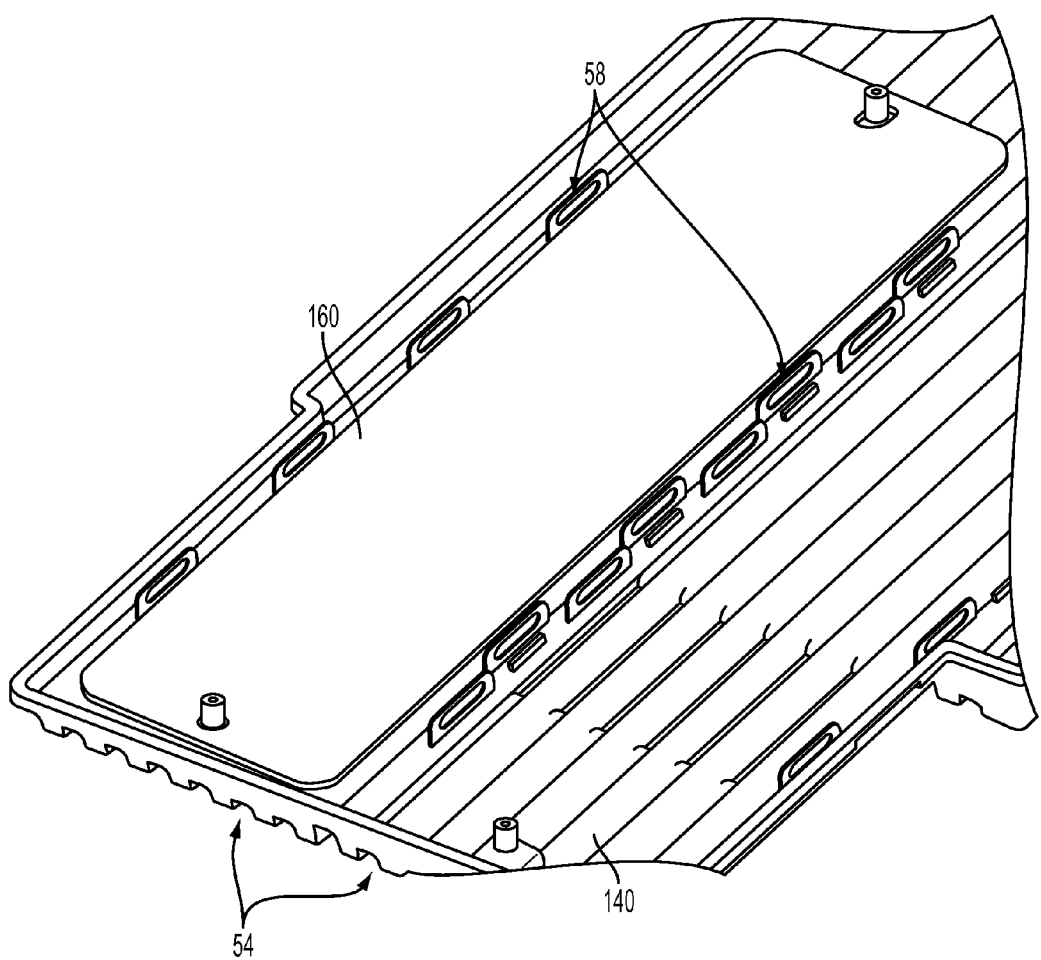
FIG. 8 illustrates a close up view of a cold plate of a battery assembly mounted to the tray of FIG. 3.

The example bulkhead 84 includes a flanged bushing 88 receiving a hose pipe 90. The flanged bushing is plastically overmolded and secured to the wall 76 via plastic welds 92 (FIG. 5). A flange 94 of the flanged bushing 88 is in the non-serviceable portion 74.

The enclosure 130 may include one or more lids, such as peel-off lids, to provide a technician with access to the serviceable portions 72 of the enclosure 130 when the tray 140 is secured to the lid 144. The wall 76 inhibits the technician from accessing the non-serviceable portion 74, and specifically batteries assemblies 18 when the technician is servicing components housed within the serviceable portions 72.

The enclosure 130 is designed to compresses the battery assemblies 18 within the non-serviceable portion 74. The enclosure 130 includes additional features to secure one or more of the battery assemblies 18 within an interior provided between a tray 140 and a lid 144. For example, the tray 140 of the enclosure 130 includes a plurality of retention features 58.

The example retention features 58 are snap-fit, loop and tab type features that include a flange 62 extending upwardly from the tray 140. The flange 62 defines an aperture 66. The tray 140 includes corrugations 154 to be positioned beneath battery assemblies 18. The flange 62 is laterally between two distinct groups of the corrugations 154. In other examples wherein two distinct battery arrays are not used, the flange 62 is laterally outside the corrugations 154.

When the battery assembly 18 is installed within the enclosure 130, a tab 70 of the battery assembly 18 extends through the aperture 66 of the flange 62. The flange 62 may flex laterally outward in a direction F (FIG. 7B) to permit movement of the tab 70 downward into a position aligned with the aperture 66.

The example flange 62 is molded with the tray 140. The flange 62, which is molded, is better able to flex to accommodate the battery assembly 18 during installation than, for example, a steel flange.

In this example, the flange 62 is a loop of plastic and the tab 70 is metallic. In another example, the design could employ a lock tab or metal or plastic that receives a reciprocal lock tab or loop of metal or plastic, or the plastic could also be a reciprocal lock tab instead of a loop.

The tray 140 also includes lips 64 that are molded with the tray 140. The lips 64 prevent the battery assemblies 18 from shifting laterally within the interior of the enclosure 130. In this example, the lips 64 alternate with the flanges 62 along the length of the battery assemblies 18.

The lid 144 can also include features to secure the battery assembly 18. For example, lid 144 includes a plurality of molded depressions 78. The depressions 78 extend downward to contact an upwardly facing surface of the battery assembly 18 in an installed position.

In this example, at least one of the depressions 78b extends between two laterally adjacent battery assemblies 18 to inhibit lateral movement of the battery assembly 18 within the enclosure 130. Additionally, there are depressions 78a along the top, fore and aft edges of the cover along the array which inhibit lateral movement of the front and rear battery assemblies in the forward and rearward directions respectively.

The example enclosure 130 includes an interior that is undersized relative to the battery assemblies 18. Thus, when the battery assembly 18 is installed, the corrugations 154 below the battery assemblies 18 may be flexed and deflected. Some of the depressions 78 in the lid 144 may also flex and deflect due to the undersized interior.

The corrugations 154 may strengthen the tray 140. In addition, the corrugations 154 could be used to hold cooling pipes 156 that communicate coolant to cool the battery assembly 18. The cooling pipes 156 may be in direct contact with cold plates 160 (FIG. 8) of the battery assembly 18 to facilitate thermal communication. Extensions from the tray may be received in aperture in the cold plate 160, or vice versa, to stabilize the cold plate 160.

Figure 9:
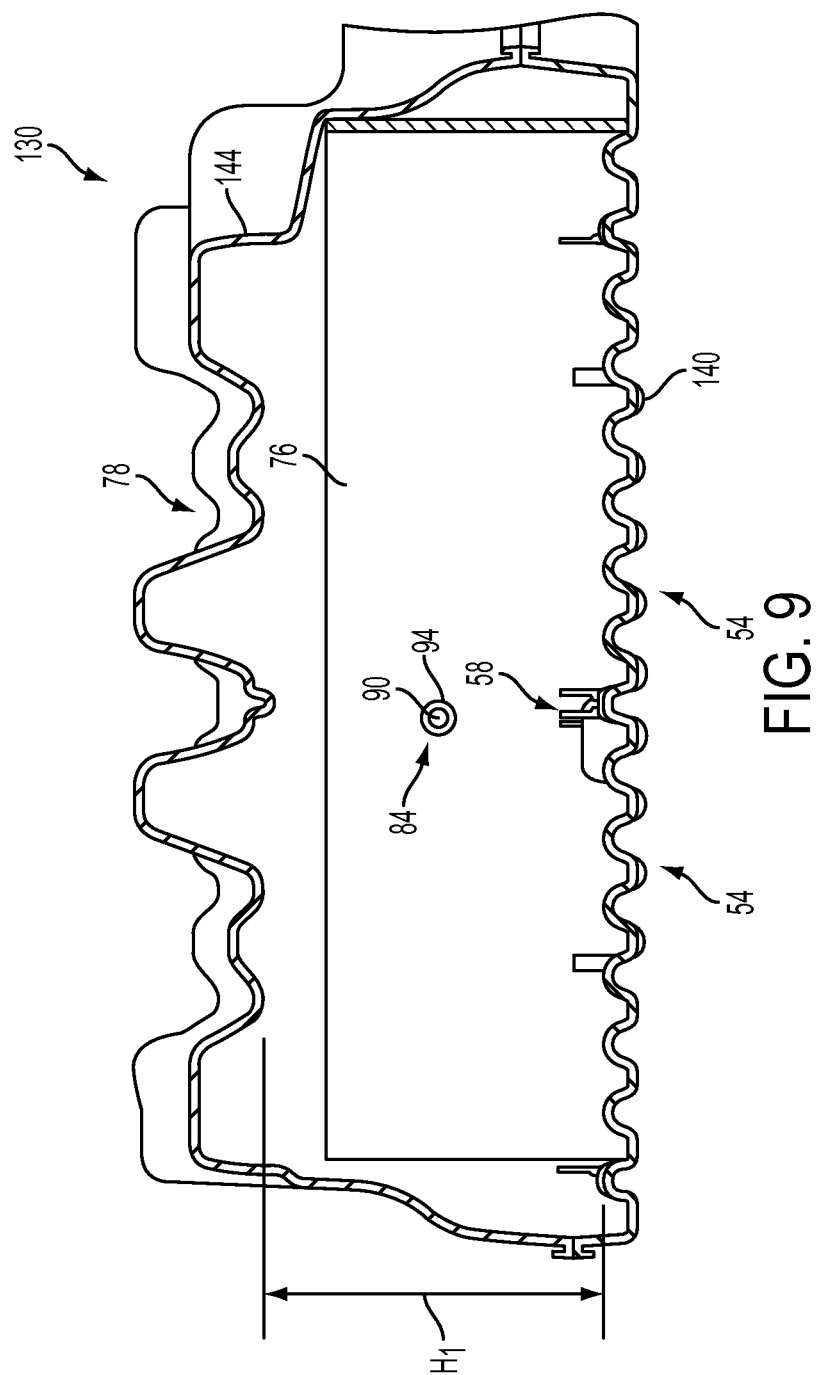
FIG. 9 illustrates a side section view at line 7-7 in FIG. 2 with battery assemblies removed from the enclosure.

FIG. 9 shows an interior of the example enclosure 130 prior to installation of the battery assemblies 18. A minimum height of an area of the interior that will receive one of the battery assemblies 18 is represented by a distance $H_1$.

Figure 10:
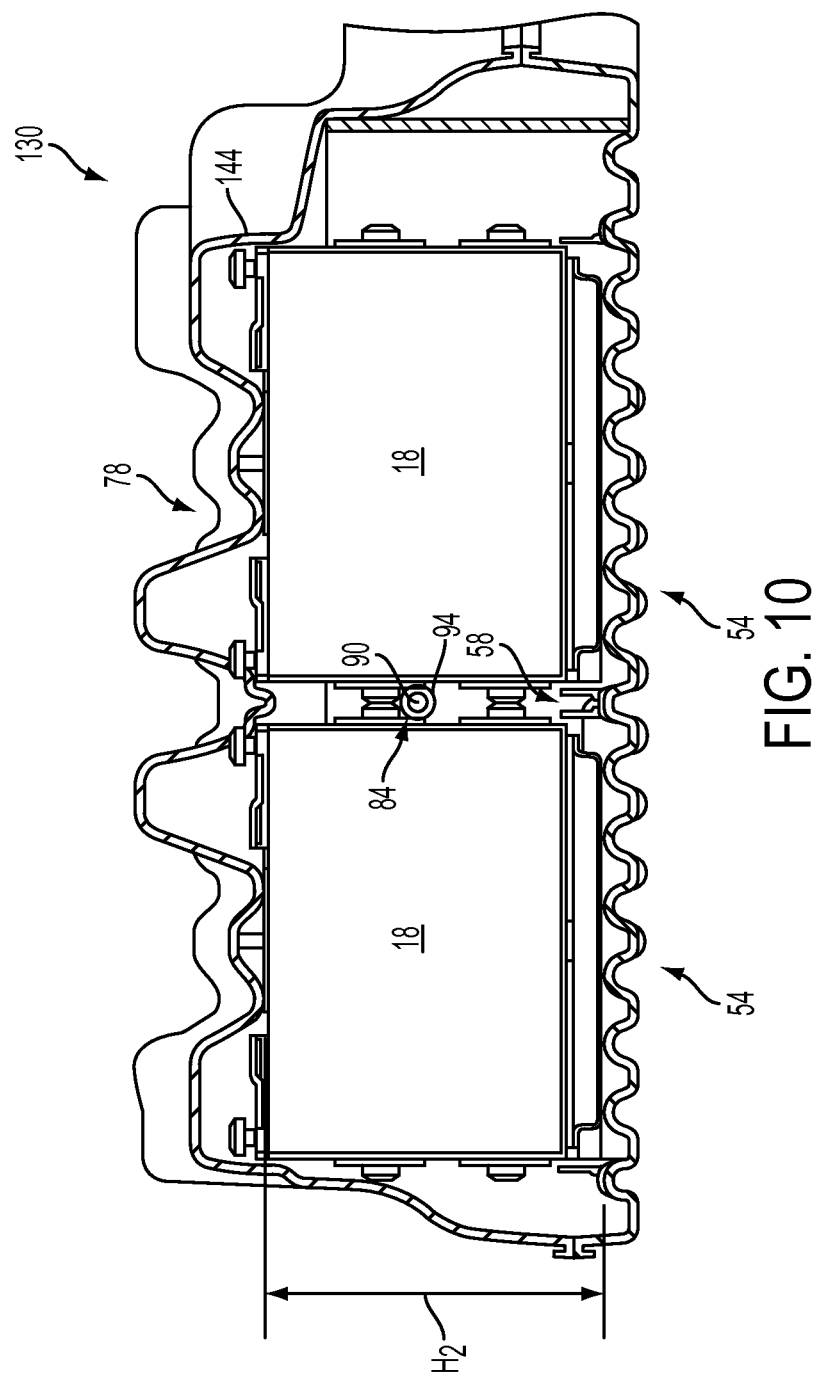
FIG. 10 illustrates a side view at line 7-7 in FIG. 2 with battery assemblies housed in the enclosure.

FIG. 10 shows the battery assembly enclosure 130 with two battery assemblies 18 installed within the interior. The battery assemblies 18 effectively increase a height of the interior to a distance $H_2$, which is greater than the distance $H_1$. The battery assembly 18 is thus compressed between the tray 140 and the lid 144. The compression facilitates stabilizing the battery assemblies 18 relative to the enclosure 130. The compression is effectively a spring force exerted on the battery assemblies 18 by the enclosure 130.

Figure 11:
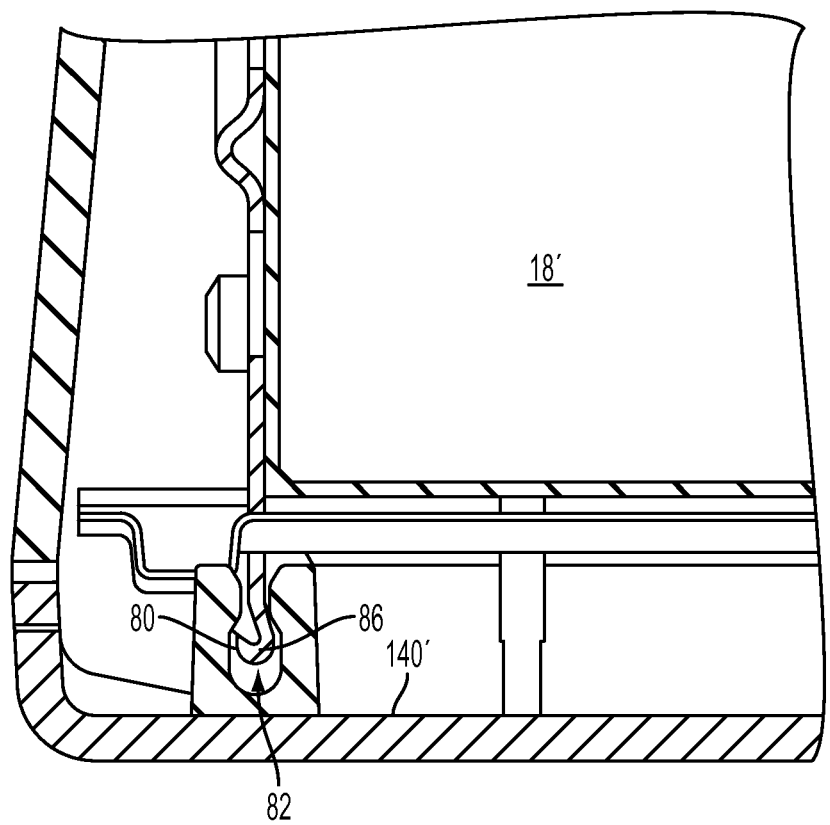
FIG. 11 shows a partial section view of another example retention feature.

Retention features other than the snap-fit style retention features 58 can be used. Referring to FIG. 11, another example battery assembly 18' may include an extension 80 that is received within a pocket 82 molded in a tray 140'. The extension includes an enlarged end 86 that is captured within the tapered walls defining the pocket 82. As the extension 80 is inserted into the pocket 82, the walls flex outward to accommodate the enlarged ends 86.

Another extension (not shown) may extend upwards from the battery assembly for receipt within a pocket of a lid.

Figure 12:
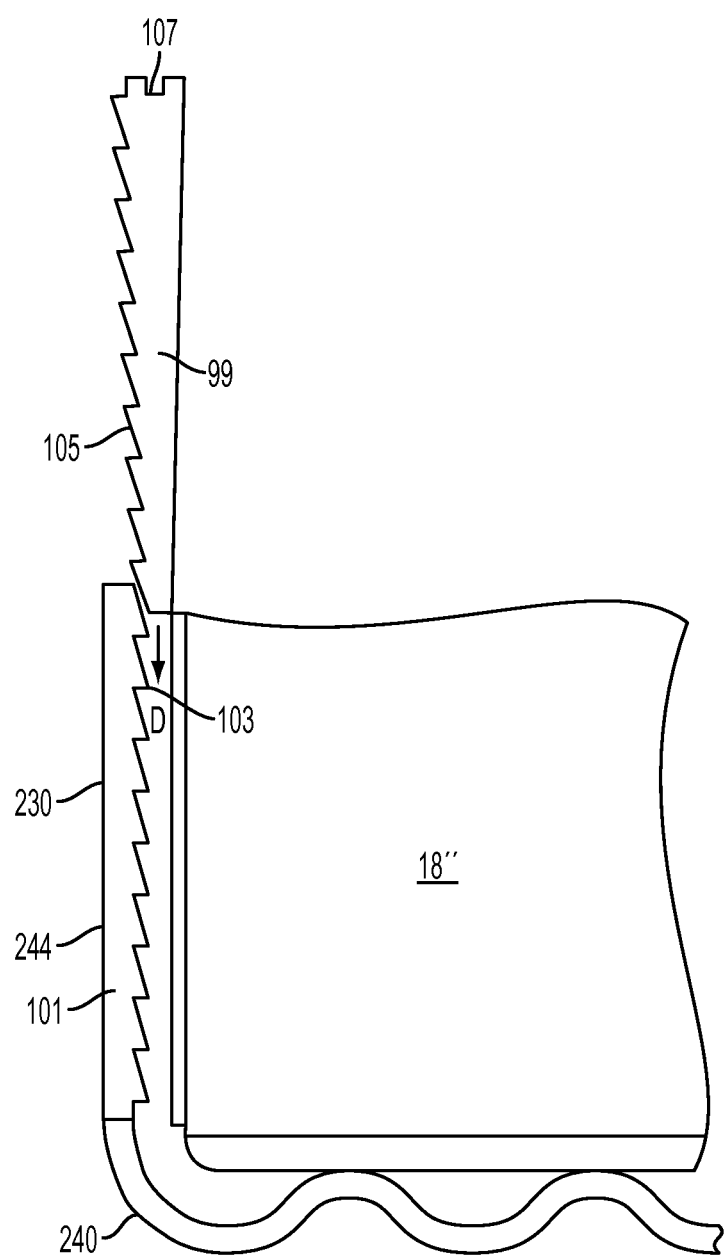
FIG. 12 shows a partial section view of another example retention feature.
Figure 13:
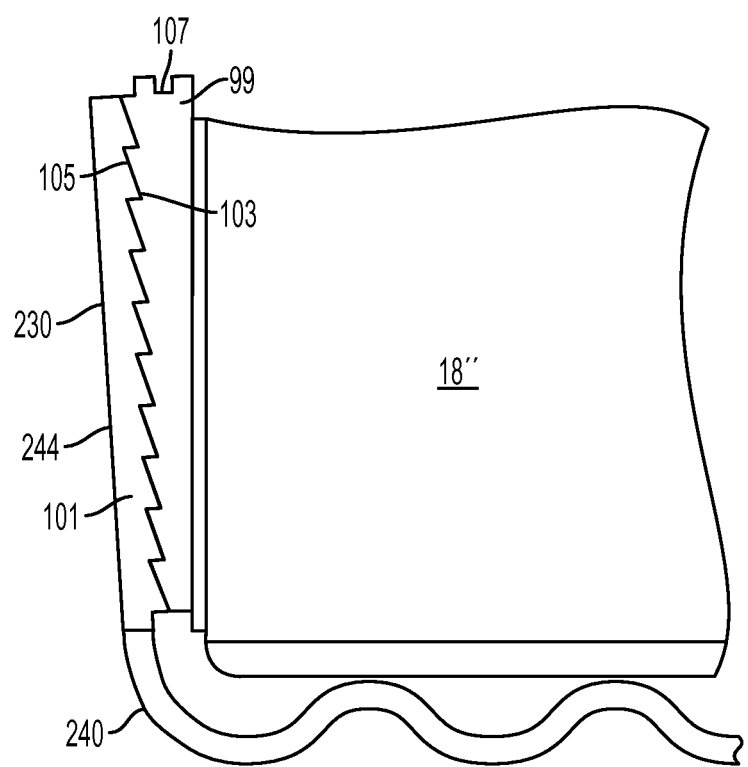
FIG. 13 shows a partial section view of the retention feature of FIG. 12 in an installed position.

Referring now to FIGS. 12 and 13, another example battery assembly 18" is retained within a tray 240 and lid 244 of an enclosure 230 with a retention wedge 99. In this example, a wall 101 of the lid 244 includes an inwardly facing edge having teeth 103. The retention wedge 99 includes teeth 105.

During assembly, the wedge 99 is moved in a direction D to wedge between the battery assembly 18" and the wall 101. The movement biases the wall 101 outward. In this position (FIG. 12), the wedge 99 prevents lateral movement of the battery assembly 18" relative to the enclosure 230. The teeth 103 contact the teeth 105 to prevent the tool 99 from backing out in a direction opposite the direction D.

The wedge 99 includes a first end having a receptacle 107 for receiving a push tool, which is used to force the wedge 99 into the installed position of FIG. 12. The first end tapers toward a second end 111. The tapering facilitates movement of the wedge 99 into the installed position. The tapering also causes biasing pressure between the wall 101 and the battery assembly 18".

Other retention features can include snap-fit hooks, grommets, Christmas tree fasteners, etc.

The example enclosure 130 is secured to a floor pan with one or more straps. The tray 140, in this example, includes a molded-in trough 96 that receives the strap and helps to stabilize the positioning of the strap relative to the enclosure. The straps could be a woven webbed material or a solid steel for example. Webbed straps can be coated or over-molded with a thermoplastic resin, for example to prevent laceration and environmental exposure.

Figure 14:
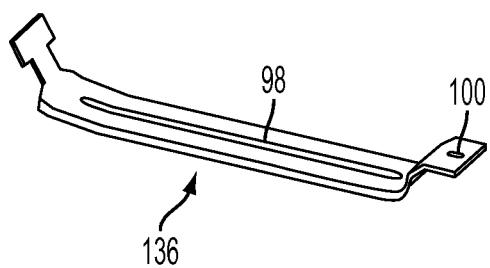
FIG. 14 shows a perspective view of example straps to support the enclosure of FIGS. 2-10.
Figure 15:
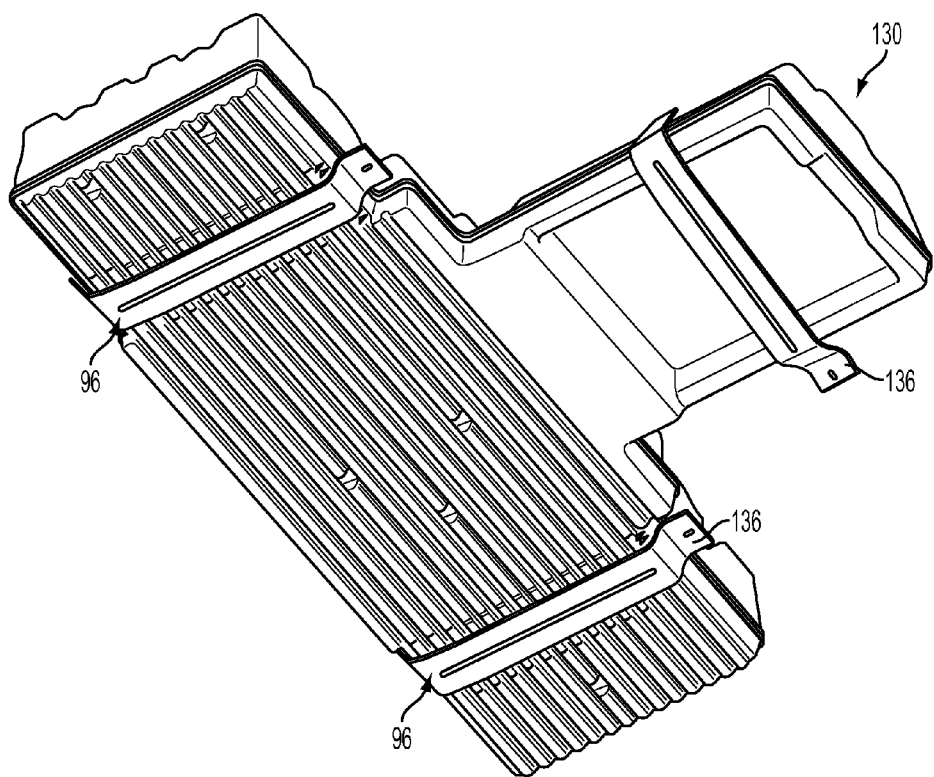
FIG. 15 shows a perspective view of the straps interfacing with the enclosure of FIGS. 2-10.

Referring to FIGS. 14 and 15, a plurality of straps 136 are used in connection with the enclosure 130. The straps 136 can have ends looping back on themselves. The strap 136 includes a collar 98 is positioned along a portion of the strap 136. The collar 98 can be made of a polymer that will present a non-abrasive, non-sharp surface to the enclosure 130. The collar 98 may include a flange 100 to that provides a fastener bearing surface for securing the strap 136 to the enclosure 130. The flange 100 may interface directly with walls of the trough 96. The collar 98 can be over-molded using high-density polyethylene, or protected with a non-steel sleeve, for example. The strap 136 may further be at least partially molded into the tray 140 or another portion of the battery enclosure 130.

The strap 136 is designed to exert a compressive force against the enclosure 130 when installed. The strap 136 can be made short to cause an interference fit between the enclosure 130 and a floor pan of the vehicle when the strap 136 is secured. The interference fit can improve retention and reduce a perceived design gap between the enclosure and the floor pan.

Features of the disclosed examples include protecting a battery assembly, or other type of assembly, with an enclosure having a reduced number of components and fasteners than prior art designs. The enclosure has a reduced manufacturing process cycle time, an enhanced manufacturing feasibility for a relatively complex design, and a reduced weight compared to other designs.

In some examples, the enclosure absorbs crash energy to enhance crashworthiness, and produces effective resistance to stone pecking, ground strike, water intrusion, and other environmental noises.

The example enclosure can have a tighter packaging footprint and enhanced energy density with respect to designs requiring flanges for mechanic fasteners, separate seals, etc. The example enclosure further can have relatively improved enclosure-to-body contact, which provides improved package density without negatively impacting targets for performance and NVH.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A battery assembly enclosure, comprising:
   a tray;
   a lid secured to the tray to provide an interior therebetween; and
   a plurality of molded retention features to secure a battery assembly received in the interior, each of the plurality of molded retention features positioned within the interior and including one of an aperture or a tab configured to engage with a corresponding aperture or tab provided by the battery assembly.

2. The enclosure of claim 1, wherein the retention features are molded together with the lid or the tray and are positioned entirely within the interior.

3. The enclosure of claim 1, wherein the retention features comprise a flange defining the aperture, the flange deflecting to receive the tab within the aperture in response to the battery assembly being installed within the interior.

4. The enclosure of claim 1, wherein the tray, the lid, or both are thermoplastic.

5. The enclosure of claim 4, wherein the lid is welded to the tray.

6. The enclosure of claim 1, further comprising a connecting wall extending from the tray, the lid, or both into the interior, the connecting wall separating a serviceable area of the interior from a non-serviceable area.

7. The enclosure of claim 1, wherein the tray includes corrugations that deflect away from the lid when the battery assembly is positioned within the interior.

8. The enclosure of claim 1, wherein the interior is undersized relative to the battery assembly when the battery assembly is outside the interior, such that the tray and the lid both compress the battery assembly when the battery assembly is inside the interior.

9. An assembly comprising the battery assembly enclosure of claim 1, further comprising a battery assembly within the interior, the battery assembly secured relative to the tray and the lid exclusively using the plurality of molded retention features.

10. An enclosure, comprising:
    a tray;
    a lid secured to the tray to provide an interior therebetween to house an assembly, wherein the interior is designed to be undersized relative to the assembly such that the assembly housed in the interior is compressed by both the tray and the lid; and
    a plurality of retention features within the interior and molded together with the lid or the tray, the plurality of retention features configured to move from a more flexed position to a less flexed position to engage and to secure the assembly received in the interior.

11. The enclosure of claim 10, wherein the retention features comprise a flange defining an aperture, the flange deflecting to receive a tab within the aperture when the assembly is installed within the interior.

12. The enclosure of claim 10, wherein the tray, the lid, or both are thermoplastic.

13. The enclosure of claim 10, wherein the lid is welded to the tray.

14. The enclosure of claim 10, further comprising a connecting wall extending from the tray, the lid, or both into the interior, the connecting wall separating a serviceable area of the interior from a non-serviceable area.

15. The enclosure of claim 10, wherein the tray includes corrugations that deflect when the assembly is positioned within the interior.

16. A method, comprising:
    engaging an assembly by moving an attachment feature of an electric vehicle enclosure from a more flexed to a less flexed position, and securing the assembly within the electric vehicle enclosure by compressing the assembly between a lid and a tray,
    wherein both the lid and the tray directly contact the assembly during the securing,
    wherein the lid, the tray, or both deflect during the securing in response to the compressing.

17. The method of claim 16, wherein the assembly is a battery assembly, wherein the lid, the tray, or both are thermoplastic.

18. The method of claim 16, further comprising securing the assembly to the lid and the tray using molded fasteners within an interior of the electric vehicle enclosure.

19. The method of claim 16, further comprising supporting the electric vehicle enclosure with a strap secured to a floorpan of the electric vehicle and extending beneath the electric vehicle enclosure such that the electric vehicle enclosure is held between the strap and the floor pan.

20. The enclosure of claim 14, further comprising a peel-off cover of the enclosure and configured to be removed to providing an opening within the enclosure that permits access to the serviceable area.

* * * * *